Patented Nov. 15, 1938

2,136,525

UNITED STATES PATENT OFFICE 2,136,525

METHOD FOR THE POLYMERIZATION OF ROSIN

Alfred L. Rummelsburg, Wilmington, Del., assignor to Hercules Powder Company, Wilmington, Del., a corporation of Delaware No Drawing. Application July 24, 1936, Serial No. 92,389

16 Claims. (Cl. 260—97)

This invention relates to a method for the polymerization of rosin.

Rosin has heretofore been treated with sulfuric acid to remove the color bodies therefrom for the production of a light colored rosin, and to increase the melting point of the rosin by polymerization. Thus, U. S. Patents No. 915,401 and No. 915,402 to Yaryan disclose a process for the refining of rosin, in which a solution of rosin in a petroleum hydrocarbon solvent is treated with sulfuric acid. Such treatment causes the color bodies of the rosin to become insoluble in the petroleum hydrocarbon solvent and be precipitated from the solution of refined rosin. U. S. Patent No. 2,017,866 to Morton discloses a process by which a gasoline solution of rosin is treated with sulfuric acid under limited and specific conditions to polymerize rosin and thereby increase its melting point.

I have discovered that the polymerization of rosin by treatment with sulfuric acid proceeds much more readily when the rosin is dissolved in a volatile halogenated organic compound, than when dissolved in the petroleum hydrocarbon solvents used by the prior art. The reason for this appears to be the partial or complete solubility of a polymerized rosin-sulfuric acid association product in the halogenated organic solvent. Whatever the reason may be, I have discovered that, under exactly the same conditions of reaction, the increase in the melting point of rosin when treated in solution in a halogenated organic compound may be as much as 75° C. greater than when treated in a petroleum hydrocarbon solution. Furthermore, much milder conditions of reaction can be used to produce a given increase in the melting point of rosin, than when using a petroleum hydrocarbon. Again sulfuric acid of higher strength may be used to treat rosin in solution in halogenated organic compounds, than has heretofore been used to treat rosin in petroleum hydrocarbons, giving a more rapid increase in the melting point of the rosin per unit of time, and consuming a smaller amount of sulfuric acid. The use of milder conditions of reaction to secure a given increase in melting point is a material commercial advantage in that it produces less depreciation of apparatus and gives economies in the amount of sulfuric acid consumed.

The method in accordance with my invention consists essentially of treating a solution of rosin in a suitable halogenated organic compound with sulfuric acid. To be suitable for this purpose the halogenated organic compound must be a volatile liquid stable to sulfuric acid under the conditions of reaction. Such compounds are, for example, liquid chlorinated hydrocarbons, as, carbon tetrachloride, dichlorobutane, tetrachlorethane, ethylene dichloride; mixtures of the lower paraffins which have been chlorinated, etc.; chlorinated aromatic hydrocarbons, as, monochlorobenzol, the liquid chlorinated toluols, etc.; the chlorinated cyclic hydrocarbons, as, chlorocyclohexane, etc.; other chlorinated compounds as dichloroethyl ether, etc.; the similar fluorinated compounds, as fluorobenzene, fluorotoluene, fluorodichloroethane, etc.; the similar bromine and iodine compounds which are volatile liquids, as, monobromobenzol, ethylene dibromide, dibromoethyl ether, iodobenzol, m-iodotoluene, o-iodotoluene, methyl iodide, ethyl iodide, propyl iodide, butyl iodide, etc. During such treatment a precipitate of a polymerized rosin-sulfuric acid association product may appear in the reaction mixture, depending upon the particular halogenated organic compound in which the rosin is dissolved. This precipitate of polymerized rosin-sulfuric acid association product usually contains color bodies of the original rosin and color bodies which may be formed by the action of the sulfuric acid on the rosin and will contain some unpolymerized rosin. I have found that such a precipitate will appear when using halogenated organic compounds, as, for example, monochlorbenzol, carbontetrachloride, dichlorobutane, etc., which are only partial solvents for the polymerized rosin-sulfuric acid association product. No such precipitate will appear when using certain other halogenated solvents, as, tetrachloroethane, dichloroethyl ether or ethylene dichloride, etc., which are solvents for the polymerized rosin-sulfuric acid association product.

When a precipitate appears, my process may be completed in either of two ways. The reaction mixture may be agitated with water to remove the sulfuric acid and cause the polymerized rosin-sulfuric acid association product with its contained color bodies, to redissolve, and then the polymerized rosin recovered from its solution by the evaporation of the solvent. In following this procedure the color bodies of the rosin are not separated from the rosin. Alternately, the precipitate may be separated from the reaction mixture, the reaction mixture treated to remove the sulfuric acid, and then the polymerized rosin recovered from its solution by evaporation of the solvent. In following this alternative procedure, a substantial portion of the color bodies is removed from the rosin, so that a rosin of lighter color is produced than when the color bodies are redissolved.

When the rosin is treated with sulfuric acid in a solvent such that no precipitate appears, the sulfuric acid is removed from the rosin solution following the desired period of treatment, by washing with water, and polymerized rosin recovered therefrom by evaporation of the volatile solvent by means of reduced pressure distillation, steam distillation or both. The use of aqueous solutions of alkali assists in removing the last traces of catalyst during the washing procedure.

The rosin treated by the method in accordance with my invention may be any of the various grades of wood rosin, American gum rosin, French gum rosin, abietic acid, pimaric acid, sapinic acid, etc. The rosin treated may be heat treated, distilled, etc. When treating wood rosin, I prefer to use a wood rosin which has been subjected to a refining operation for the removal of color bodies, although unrefined wood rosin may, if desired, be treated by my process. Thus, for example, a wood rosin having a color grade of I (U. S. standard rosin types) is entirely satisfactory. Any of the usual grades of gum rosin are well adapted for treatment by my process.

More particularly, the method in accordance with this invention involves the treatment of rosin as, for example, the various grades of wood rosin, gum rosin, heat-treated rosin, distilled rosin, etc., in solution in a suitable volatile halogenated organic compound, with sulfuric acid of a concentration within the range of about 65% to about 101%, by weight, and preferably of a concentration within the range of about 85% to about 96%. The sulfuric acid will be used in an amount within the range of about 1.0% to about 100%, by weight, and preferably within the range of about 15% to about 40%, by weight on the basis of the rosin contained. The treatment will be conducted with vigorous agitation, at a temperature within the range of $-10°$ C. to about $100°$ C. or even higher, and preferably within the range of about $10°$ C. to about $40°$ C., and for a period of time from the time required to add the sulfuric acid to the rosin solution to about eight hours or more. The concentration of rosin in solution in the halogenated organic compound will be within the range of about 10% to about 75%.

In following the embodiment of my invention in which a solvent is used such that no precipitate appears, or in which a precipitate does appear, but is allowed to remain in the solution, after the sulfuric acid has reacted with the solution of rosin for the desired period of time, the reaction mixture is washed with hot or cold water, or aqueous solutions of salts, or dilute aqueous solutions of alkali, to remove the sulfuric acid and if a precipitate is present to cause the precipitate to go back into solution. The amount of water or aqueous solution used to wash the reaction mixture may vary from a weight equal to the weight of sulfuric acid present to ten times that amount or more. The use of an aqueous solution of electrolytes is desirable when the solution of rosin shows a tendency to emulsify in the wash water. Inorganic salts, such as, for example, alkali chlorides, sulfates, borates, phosphates, acetates, alkaline earth halides, aluminum halides, etc., may be added to the wash water in concentrations varying from very dilute to saturated, and the wash water may be at any temperature within the range of $0°$ C. to $100°$ C. In general, it will be found that concentrations of salt within the range of about 0.5% to about 10% by weight of the water are satisfactory. Dilute solutions of alkalis, such as, sodium hydroxide, ammonium hydroxide, ammonium carbonate, sodium carbonate, etc., and organic bases, such as triethanolamine, etc., are very efficient in removing sulfuric acid from the rosin solution, but care is necessary in their use to avoid reaction with the rosin. The concentration of alkali may vary from about 0.1% to about 10%. Ammonium hydroxide or ammonium carbonate is preferable for the purpose, since any ammonium salt of the rosin which may be formed can easily be decomposed by heat. After the reaction mixture has been washed to decompose the sludge and put back into solution, the polymerized rosin is recovered from its solution by the evaporation of the solvent by means of reduced pressure distillation or steam distillation.

In following the alternate embodiment of my invention in which a solvent is used, such that a precipitate appears and is separated, after the sulfuric acid has reacted with the solution of rosin for the desired period of time, the precipitate which has formed may be conveniently removed from the reaction mixture by centrifuging, or by allowing it to settle and then separating it from the reaction mixture by decantation. The time required for the sludge to settle depends upon a number of factors, such as, for example, the size of the charge, the viscosity of the rosin solution, etc., and may vary from several minutes to several hours. The separation by centrifuging will be much more rapid. Following the removal of the precipitate, the reaction mixture may be treated in either of two ways. The reaction mixture may, if desired, be washed with hot or cold water, or hot or cold solutions of salts, such as, for example, alkali salts of chlorides, sulfates, phosphates, borates, etc., or dilute alkali solutions, to remove the sulfuric acid. The conditions for washing will be the same as those described hereinbefore for washing the reaction mixture to put the precipitate back into solution. After the polymerized rosin is washed free of sulfuric acid, the polymerized rosin will be recovered by evaporating the solvent. Alternately, the reaction mixture after the decantation of the sludge may be treated with an absorbent such as activated carbon, fuller's earth, fibrous asbestos, etc. in order to remove the last traces of the color bodies. The amount of absorbent used may vary widely and will depend upon the difficulty and the degree of refinement desired, and on the method of operation used. The absorbent material may be contacted with the rosin solution by agitation of the absorbent in the rosin solution or by running the rosin solution through a bed of the absorbent material. After treatment of the reaction mixture with the absorbent material, and the complete removal of the absorbent material therefrom, as by filtration or centrifuging, the reaction mixture is washed to free it from sulfuric acid as described hereinbefore, and polymerized rosin recovered from the remaining solution by evaporation of the solvent.

In following the alternative embodiment of my invention in which color bodies are separated from the solution of rosin in a halogenated organic compound following the sulfuric acid treatment, the precipitate containing polymerized rosin, rosin color bodies, etc., can be recovered as a dark colored polymerized rosin by extracting the separated color body sludge in a suitable solvent therefor, washing the solution free of sulfuric acid with water, aqueous salt solutions or dilute aqueous alkali solutions, and then recovering a dark colored polymerized rosin from this solution by evaporating the solvent. Suitable solvents for the precipitate are halogenated hydrocarbons, such as, for example, ethylene dichloride, carbon tetrachloride, chlorobenzene, etc.; ethers, such as, for example, diethyl ether, isopropyl ether, dichloroethyl ether; aromatic hydrocarbons, such as for example, benzol, toluol, xylol, alkylated benzols, etc.

A dark colored polymerized rosin may, likewise, be recovered from the precipitate by adding the sludge of the precipitate and sulfuric acid, separated from the rosin solution, to an excess of water with cooling and agitation. After the removal of the sulfuric acid the sludge will dissolve in a halogenated organic solvent which has been occluded from the rosin solution, to form a viscous solution of dark colored polymerized rosin. This solution may then be washed free of sulfuric acid with water, aqueous salt solution or dilute aqueous alkali solution, or it may be diluted with more of the solvent, or with any other rosin solvent, and then washed free of sulfuric acid. Due to the difficulty of washing a very viscous rosin solution, the latter course is preferable.

The above described alternative procedures make possible the removal of all the precipitate or putting all of it back into solution. Intermediate procedures may be followed in which a part of the precipitate is put back into solution by treatment with a limited amount of water, or by treatment with an excess of water for a limited time. In general, the color of the polymerized rosin will decrease as the amount of the precipitate put back into solution is decreased and, conversely, the increase in the melting point of the rosin becomes greater. The proportion of the precipitate which is redissolved will depend on the amount of water added, or if an excess of water is added by the time for which the water is allowed to remain in contact with the precipitate. The amount of water can be more accurately controlled than the time of contact.

The concentration of rosin in solution in the halogenated organic compound, treated with sulfuric acid in accordance with the procedure of this invention may vary over a range of about 10% to about 75%. Lower concentrations of rosin in the solution favor in the production of the lightest colored products, at the expense of the increase secured in the melting point of the rosin. High concentrations favor the production of the greatest increase in the melting point of rosin in the shortest reaction period and with the use of minimum amounts of sulfuric acid. Likewise, high concentrations favor maximum reductions in the unsaturation of the rosin in the shortest reaction time.

The concentration of sulfuric acid used in the treatment of the rosin solution can vary over the range of about 65% to about 101%, by weight, and will be selected on the basis of the desired product and the selection of the other variables of the reaction. I have found that sulfuric acid of a concentration within the range of about 85% to about 96%, by weight, is convenient to use. The amount of sulfuric acid used in the reaction mixture may be varied over a wide range. Thus, amounts of sulfuric acid used may vary within the range of about 1% to 100% based on the weight of the rosin present. In general, it will be found desirable to use an amount of sulfuric acid within the range of about 15% to about 40% based on the rosin present.

The temperature at which the reaction is conducted may vary from about $-10°$ C. to about $100°$ C. Below $-10°$ C. the rate of reaction becomes very slow, requiring long reaction periods to produce any appreciable increase in the melting point of the rosin. Above a temperature of about $65°$ C. the reaction conditions become sufficiently severe that the rosin is darkened in color during the reaction, so that the improvement in color secured by the removal of the color body sludge is lost. However, temperatures as high as $100°$ C. may be used if a pale product is not desired. I have found that the optimum temperature range is usually from about $10°$ C. to about $40°$ C.

The length of time the reaction is allowed to continue will depend on the extent to which it is desired to increase the melting point of the rosin, the desired color of the product, and upon the conditions under which the reaction is being run. Thus, to secure any given increase in the melting point of the rosin being treated, the time of reaction will depend largely upon the temperature of the reaction mixture, the concentration of rosin in the rosin solution, and the amount and concentration of sulfuric acid present. The addition of the sulfuric acid usually requires from about ten minutes to about thirty minutes, depending on size and shape of vessel, efficiency of cooling, etc., if an excessive temperature rise is to be avoided. The reaction may be stopped at that point or allowed to continue 8 hours or more, although I have found that an additional period of time within the range of 1 to 3 hours after the addition of the sulfuric acid is usually sufficient. A reaction period of more than about 3 hours usually results in an undue darkening of the product, and for that reason is desirably avoided.

The efficiency of agitation of the reaction mixture during the sulfuric acid treatment is a factor of considerable importance in obtaining the maximum increase in the melting point of rosin under any given set of conditions. It will be found that the more efficient the agitation, the greater will be the increase in the melting point of the rosin. Under a given set of reaction conditions the efficiency of agitation may make a difference of $5°$ C., or more, in the melting point of the product. In the examples given hereinafter, the agitation and size of reaction vessel were kept the same throughout, so that the results are comparable.

The procedure in accordance with this invention may be modified to give the solution of rosin a multiple treatment with sulphuric acid, and such modification will frequently be found to be advantageous. For example, a process wherein a precipitate or sludge is obtained may be carried out by treating a solution of rosin in solution in a chlorinated compound with sulphuric acid, removing the sludge, as described above, then subjecting this treated solution to one or more similar treatments with sulphuric acid. The solution may be given any desired number of treatments and many possible combinations of treatments may be worked out, depending upon whether the precipitate is separated from the solution or treated to cause it to redissolve. By the use of such multiple treatments it will be found that the total time of reaction may be shortened and the total consumption of sulphuric acid decreased, to produce a given increase in the melting point of the rosin. Also, greater increases in melting points can be produced by multiple treatments than are possible with a single treatment and paler products can be produced for a given increase in melting point.

The properties of rosin treated by the method of this invention will depend upon the properties of the original rosin and the exact conditions of treatment. It will be found that the melting point of rosin will show the greatest increase when treated by the procedure in which the precipitated association product is soluble in the rosin solution or if insoluble is put back into the rosin solution and, hence, no color bodies removed from the rosin. A rosin treated by this procedure will be found to have its melting point, as determined by the drop method, increased from about 12° C. to about 50° C., its unsaturation decreased, its color somewhat darkened, and its acidity either unchanged, slightly reduced, or very substantially reduced as may be desired. When rosin is treated by the alternative procedure in which color bodies are removed from the rosin solution, a somewhat smaller increase is made in the melting point of the rosin, the product is lighter in color, and usually has a higher acid number.

The product of this method consists of a mixture of polymerized rosin, unpolymerized rosin, unsaponifiable matter, and small amounts of resin oils which are formed by the action of the sulfuric acid. If desired, the product may be freed from the resin oils by reduced pressure distillation, thereby greatly improving the product by removing any tackiness which may be produced by such oils. I have found that a polymerized wood rosin, from which the resin oils and unpolymerized material have been removed, will have a melting point within the range of 170° C. to 180° C., and to have a molecular weight as determined by the Rast method of approximately twice that of unpolymerized rosin.

It will be appreciated that the melting points given above and those given hereinafter were obtained by the A. S. T. M. method for determining drop melting points, and it should be noted that this method must be followed exactly to obtain accurate and comparable results.

Practical embodiments of the method in accordance with this invention, and the properties of the polymerized rosins produced thereby, are illustrated by the examples which follow.

The procedure in accordance with this invention in which rosin is polymerized by a sulfuric acid treatment of a solution of the rosin in a halogenated organic compound in which the polymerized rosin-sulfuric acid association product is soluble, is illustrated by the following examples.

Example I

Seventy grams of 95% sulfuric acid were added to approximately 275 grams of I wood rosin dissolved in 555 grams of ethylene dichloride at a temperature of 12°–15° C. within a period of 0.25 hour. This mixture was then agitated for a period of one hour at a temperature of 25°–29° C., and then 500 cc. of water were added and the mixture agitated for an additional 0.5 hour. The ethylene dichloride solution of rosin was then separated from the aqueous sulfuric acid and washed with several portions of water until the sulfuric acid was completely removed. The polymerized rosin was then recovered by evaporating the ethylene dichloride. The properties of this product as compared with those of the original I wood rosin are listed in the following table.

Table I

|  | I wood rosin | Polymerized rosin |
|---|---|---|
| Melting point (drop method) | 80° C. | 130° C. |
| Acid number | 163 | 103 |
| (SCN)$_2$ value | 85 | 56 |
| Color (U. S. standard rosin types) | A | F |

Example II

The procedure described in Example I was duplicated, except that the reaction mixture was agitated for only 10 minutes, instead of one hour, following the addition of sulfuric acid. The properties of the product produced in this way as compared with those of the original I wood rosin are listed in the following table.

Table II

|  | I wood rosin | Polymerized rosin |
|---|---|---|
| Melting point (drop method) | 80° C. | 120° C. |
| Acid number | 163 | 162 |
| (SCN)$_2$ value | 85 | 70 |
| Color (U. S. standard rosin types) | I | G |

A comparison of the characteristics of the product of Example I with those of the product of Example II, shows that the shorter time of reaction used in Example II, gave less increase in melting point than secured in Example I, but gave a product having practically the same acid number as the rosin from which it was prepared.

The procedure in accordance with this invention in which rosin is polymerized by a sulfuric acid treatment of a solution of the rosin in a halogenated organic compound in which the polymerized rosin-sulfuric acid-association product is only partially soluble, and in which the portion which precipitates is removed from the rosin solution, is illustrated in a series of Examples Nos. 3, 4, and 5 which follow. Included in this series are Examples Nos. 6, 7, and 8, for the purposes of comparison in which the solvent used is a chlorinated organic compound in which the polymerized rosin-sulfuric acid association product is entirely soluble and in which no precipitate is removed from the rosin solution.

In each of the examples of this series, a 30% by weight solution of I wood rosin in a halogenated organic compound was treated with 25% of 95% strength sulfuric acid based on the weight of rosin within a period of 15 minutes with agitation at a temperature of 15°–20° C. This mixture was then agitated for a period of 1.25 hours at a temperature of 15°–20° C. The mixture was allowed to stand 4 minutes, decanted from the precipitate of polymerized rosin-sulfuric acid association product, if such had appeared, and washed free of sulfuric acid with water. The polymerized rosin was then recovered by evaporating the solvent under atmospheric pressure and then in vacuo. In the examples in which a precipitate was separated, a dark polymerized rosin was recovered therefrom by extracting the precipitate with ether, washing the extract free of sulfuric acid with water, and evaporating off the extracting solvent under atmospheric pressure and then in vacuo. The characteristics and yields of polymerized rosin secured in each example are given in Table III. In this table the polymerized rosin from the solution in the halogenated organic compound is identified as "pale polymerized rosin," while that from the precipitate is identified as "dark polymerized rosin."

to about 100° C., adding water to the reaction mixture to cause the precipitated association product to be decomposed and the polymerized rosin therein to be redissolved in the chlorinated Table III

| Example number | Solvent used | Characteristics of pale polymerized rosin | | | Yield of pale polymerized rosin | Yield of dark polymerized rosin |
|---|---|---|---|---|---|---|
| | | Acid number | Melting point | Color | | |
| | | | °C. | | Percent | Percent |
| 3 | Monochlorobenzol | 160 | 120 | G | 75 | 15+ |
| 4 | Carbon tetrachloride | 164 | 94 | M | 69 | 20 |
| 5 | Dichlorobutane | 160 | 117 | H | 77 | 15 |
| 6 | Ethylene dichloride | 106 | 124 | F | 95+ | None |
| 7 | Dichloroethyl ether | 163 | 113 | F | 85 | None |
| 8 | Tetrachloroethane | 138 | 125 | F+ | 94 | None |

In this table it will be observed that higher melting points, but darker colors, are obtained when no precipitate is separated from the solution.

The above yields are a minimum and may be increased by varying the reaction conditions regarding amount of catalyst, temperature, time of reaction, etc.

It will be understood that the details and examples given herein are illustrative only, and in no way limiting on my invention as broadly described, and claimed.

What I claim and desire to protect by Letters Patent is:

1. A method for the polymerization of rosin which includes bringing a solution of rosin in a volatile liquid halogenated organic compound stable to sulfuric ac'd into intimate contact with strong sulfuric acid under conditions of reaction adapted to effect polymerization of the rosin, separating the polymerized rosin solution from the sulfuric acid and recovering the polymerized rosin by evaporating the halogenated organic compound.

2. A method for the polymerization of rosin which includes bringing a solution of rosin in a volatile liquid halogenated organic compound stable to sulfuric acid into intimate contact with sulfuric acid having a concentration within the range of about 65% to about 101% by weight at a temperature within the range of about −10° C. to about 100° C., separating the polymerized rosin solution from the sulfuric acid and recovering polymerized rosin by evaporating the halogenated organic compound.

3. A method for the polymerization of rosin which includes bringing a solution of rosin in a volatile liquid halogenated organic compound stable to sulfuric acid into intimate contact with sulfuric acid having a concentration within the range of about 65% to about 101% by weight at a temperature within the range of about −10° C. to about 100° C., separating the polymerized rosin solution from the sulfuric acid, washing the polymerized rosin solution with water, and recovering the polymerized rosin by evaporating the halogenated organic compound.

4. A method for the polymerization of rosin which includes bringing a solution of rosin in a volatile liquid halogenated organic compound stable to sulfuric acid and which is a partial solvent for the polymerized rosin-sulfuric acid association product, into intimate contact with sulfuric acid having a concentration within the range of about 65% to about 101% by weight at a temperature within the range of about −10° C. to about 100° C., separating the polymerized rosin solution from the precipitated polymerized rosin-sulfuric acid association product formed therein, removing sulfuric acid from the polymerized rosin solution and recovering polymerized rosin in solution.

5. A method for the polymerization of rosin which includes bringing a solution of rosin in a volatile liquid halogenated organic compound stable to sulfuric acid and which is a partial solvent for the polymerized rosin-sulfuric acid association product, into intimate contact with sulfuric acid having a concentration within the range of about 65% to about 101% by weight at a temperature within the range of about −10° C. to about 100° C., separating the polymerized rosin solution from the precipitated polymerized rosin-sulfuric acid association product formed therein, removing the sulfuric acid from the polymerized rosin solution, and recovering polymerized rosin from its solution in the halogenated organic compound.

6. Method for the polymerization of rosin which includes bringing a solution of rosin in a volatile liquid halogenated organic compound stable to sulfuric acid and which is a partial solvent for the polymerized rosin-sulfuric acid association product, into intimate contact with sulfuric acid having a concentration within the range of about 65% to about 101% by weight at a temperature within the range of about −10° C. to about 100° C., separating the polymerized rosin solution from the precipitated polymerized rosin-sulfuric acid association product formed therein, removing the sulfuric acid from the polymerized rosin solution, and recovering polymerized rosin from its solution in the halogenated organic compound, dissolving the precipitate in a solvent therefor, removing sulfuric acid from the solution of the precipitate, and recovering a dark-colored polymerized rosin therefrom.

7. A method for the polymerization of rosin which includes bringing a solution of rosin in a volatile liquid halogenated organic compound stable to sulfuric acid and which is a solvent for the polymerized rosin-sulfuric acid association product, into intimate contact with sulfuric acid having a concentration within the range of about 65% to about 101% by weight at a temperature within the range of about −10° C. to about 100° C., removing the sulfuric acid from the rosin solution and recovering polymerized rosin therefrom.

8. A method for the polymerization of rosin which includes bringing a solution of rosin in a volatile liquid halogenated organic compound stable to sulfuric acid into intimate contact with strong sulfuric acid under conditions of reaction adapted to effect polymerization of the rosin, washing the polymerized rosin solution free of sulfuric acid and recovering polymerized rosin therefrom by evaporating the halogenated organic compound.

9. A process for the polymerization of rosin as defined in claim 1, in which the rosin solution is subjected to a plurality of treatments with strong sulfuric acid, prior to separating polymerized rosin therefrom.

10. A method for the polymerization of rosin which includes bringing a solution of rosin in a volatile liquid halogenated organic compound stable to sulfuric acid and which is a solvent for the polymerized rosin-sulfuric acid association product, with sulfuric acid having a concentration within the range of about 85% to about 96% by weight at a temperature within the range of about 10° C. to about 40° C., removing the sulfuric acid from the rosin solution and recovering polymerized rosin therefrom.

11. The process as defined in claim 2 in which the volatile liquid halogenated organic compound utilized is monochlorobenzol.

12. The proccess as defined in claim 4 in which the volatile liquid halogenated organic compound utilized is monochlorobenzol.

13. The process as defined in claim 5 in which the volatile liquid halogenated organic compound utilized is monochlorobenzol.

14. The process as defined in claim 7 in which the volatile liquid halogenated organic compound is ethylene dichloride.

15. The process as defined in claim 7 in which the volatile liquid halogenated organic compound is tetrachlorethane.

16. A method for the polymerization of rosin which includes bringing a solution of rosin in a volatile liquid halogenated organic compound stable to sulfuric acid and which is a partial solvent for the polymerized rosin-sulfuric acid association product, into intimate contact with sulfuric acid having a concentration within the range of about 85% to about 96% by weight at a temperature within the range of about 10° C. to about 40° C., separating the polymerized rosin solution from the precipitated polymerized rosin-sulfuric acid association product formed therein, removing the sulfuric acid from the polymerized rosin solution, and recovering polymerized rosin from its solution in the halogenated organic compound.

ALFRED L. RUMMELSBURG.

---

CERTIFICATE OF CORRECTION.

Patent No. 2,136,525.                                November 15, 1938.

ALFRED L. RUMMELSBURG.

It is hereby certified that error appears in the printed specification of the above numbered patent requiring correction as follows: Page 6, first column, line 14, claim 10, after the comma and before "with" insert the words into intimate contact; and that the said Letters Patent should be read with this correction therein that the same may conform to the record of the case in the Patent Office.

Signed and sealed this 10th day of January, A. D. 1939.

Henry Van Arsdale (Seal)                                              Acting Commissioner of Patents.

sulfuric acid and recovering polymerized rosin therefrom by evaporating the halogenated organic compound.

9. A process for the polymerization of rosin as defined in claim 1, in which the rosin solution is subjected to a plurality of treatments with strong sulfuric acid, prior to separating polymerized rosin therefrom.

10. A method for the polymerization of rosin which includes bringing a solution of rosin in a volatile liquid halogenated organic compound stable to sulfuric acid and which is a solvent for the polymerized rosin-sulfuric acid association product, with sulfuric acid having a concentration within the range of about 85% to about 96% by weight at a temperature within the range of about 10° C. to about 40° C., removing the sulfuric acid from the rosin solution and recovering polymerized rosin therefrom.

11. The process as defined in claim 2 in which the volatile liquid halogenated organic compound utilized is monochlorobenzol.

12. The proccess as defined in claim 4 in which the volatile liquid halogenated organic compound utilized is monochlorobenzol.

13. The process as defined in claim 5 in which the volatile liquid halogenated organic compound utilized is monochlorobenzol.

14. The process as defined in claim 7 in which the volatile liquid halogenated organic compound is ethylene dichloride.

15. The process as defined in claim 7 in which the volatile liquid halogenated organic compound is tetrachlorethane.

16. A method for the polymerization of rosin which includes bringing a solution of rosin in a volatile liquid halogenated organic compound stable to sulfuric acid and which is a partial solvent for the polymerized rosin-sulfuric acid association product, into intimate contact with sulfuric acid having a concentration within the range of about 85% to about 96% by weight at a temperature within the range of about 10° C. to about 40° C., separating the polymerized rosin solution from the precipitated polymerized rosin-sulfuric acid association product formed therein, removing the sulfuric acid from the polymerized rosin solution, and recovering polymerized rosin from its solution in the halogenated organic compound.

ALFRED L. RUMMELSBURG.

CERTIFICATE OF CORRECTION.

Patent No. 2,136,525. November 15, 1938.

ALFRED L. RUMMELSBURG.

It is hereby certified that error appears in the printed specification of the above numbered patent requiring correction as follows: Page 6, first column, line 14, claim 10, after the comma and before "with" insert the words into intimate contact; and that the said Letters Patent should be read with this correction therein that the same may conform to the record of the case in the Patent Office.

Signed and sealed this 10th day of January, A. D. 1939.

Henry Van Arsdale (Seal) Acting Commissioner of Patents.